(12) United States Patent
Shibata

(10) Patent No.: US 7,721,841 B2
(45) Date of Patent: May 25, 2010

(54) VEHICULAR STEERING CONTROL APPARATUS AND VEHICULAR STEERING CONTROL METHOD

(75) Inventor: Kenji Shibata, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 778 days.

(21) Appl. No.: 11/594,066

(22) Filed: Nov. 8, 2006

(65) Prior Publication Data
US 2007/0107977 A1 May 17, 2007

(30) Foreign Application Priority Data
Nov. 11, 2005 (JP) ............... 2005-327296

(51) Int. Cl.
*B62D 5/04* (2006.01)
(52) U.S. Cl. ...................... 180/407; 180/446
(58) Field of Classification Search ............... 180/443, 180/444, 446, 405, 407; 701/41
See application file for complete search history.

(56) References Cited

U.S. PATENT DOCUMENTS

| | | | | |
|---|---|---|---|---|
| 6,186,267 B1* | 2/2001 | Hackl et al. | | 180/444 |
| 7,168,520 B2* | 1/2007 | Weeber et al. | | 180/443 |
| 7,530,422 B2* | 5/2009 | Bolourchi et al. | | 180/406 |
| 2005/0230179 A1* | 10/2005 | Nakatsu et al. | | 180/444 |
| 2006/0118352 A1* | 6/2006 | Ito | | 180/444 |
| 2008/0116002 A1* | 5/2008 | Jungbecker et al. | | 180/444 |

FOREIGN PATENT DOCUMENTS

| | | |
|---|---|---|
| DE | 197 51 137 A1 | 9/1998 |
| DE | 10 2004 009 816 A1 | 9/2005 |
| JP | A 09-254804 | 9/1997 |
| JP | A-2002-127917 | 5/2002 |
| JP | A-2003-072574 | 3/2003 |

* cited by examiner

*Primary Examiner*—Ann Marie M Boehler
(74) *Attorney, Agent, or Firm*—Oliff & Berridge PLC

(57) ABSTRACT

The ratio of the angular speed of a pinion shaft to the angular speed of a steering wheel is computed. The steering torque Tst transferred to the steering wheel is computed as a multiplication product of the ratio of angular speed and the steering torque Tm of the pinion shaft. The steering torque ΔTst transferred to the steering wheel due to actuation of a steered wheel turning angle variable device is computed as a value obtained by subtracting the steering torque Tm from the steering torque Tst. An electric power steering control device is controlled so as to generate a steering torque fluctuation-reducing assist torque corresponding to the steering torque ΔTst.

14 Claims, 10 Drawing Sheets

VEHICULAR STEERING CONTROL APPARATUS AND VEHICULAR STEERING CONTROL METHOD

INCORPORATION BY REFERENCE

The disclosure of Japanese Patent Application No. 2005-327296 filed on Nov. 11, 2005 including the specification, drawings and abstract is incorporated herein by reference in its entirety.

BACKGROUND OF THE INVENTION

1. Field of the Invention

The invention relates to a vehicular steering control apparatus and a vehicular steering control method More particularly, the invention relates to a vehicular steering control apparatus that has a steering transfer ratio variable device that changes the steering transfer ratio of the transfer from steering input device to steered wheels, and a power steering device that generates steering assist torque, and a vehicular steering control method.

2. Description of the Related Art

As one of steering control apparatuss of vehicles, such as motor vehicles, a steering control apparatus as described in, for example, Japanese Patent Application Publication No. JP-A-9-254804, is known which, in a vehicle having a power steering device that generates steering assist torque, detects the steering torque and the rotation angle of a steering shaft, and controls the assist torque so as to restrain changes in the steering reaction force attributed to a joint of steering shafts on the basis of the steering torque and the rotation angle of the steering shaft, and therefore restrains the deterioration of the steering feeling caused by fluctuations in the steering torque.

This steering control apparatus can restrain the changes in the steering reaction force attributed to changes in the torque transferred through the joint in association with rotation of the steering shaft, and therefore can restrain the deterioration of the steering feeling caused by fluctuations in the steering torque.

As a steering control apparatus for a vehicle, such as a motor vehicle or the like, a steering control apparatus is well known which is equipped with a steering transfer ratio variable device that changes the steering transfer ratio of the transfer from the steering wheel to the steered wheel by changing the relative rotation angle of steered wheel turning mechanism-side steering shaft with respect to a steering wheel-side steering shaft.

In the steering control apparatus equipped with the steering transfer ratio variable device, the change in the steering reaction force attributed to a change in the torque transferred through the joint is amplified by a change in the relative rotation angle of the steered wheel turning mechanism-side steering shaft with respect to the steering wheel-side steering shaft which is caused by the steering transfer ratio variable device, and at the same time, the phase relationship of the change in the steering reaction force to the rotation angle of the steering wheel is also thereby changed.

In the steering control apparatus of a vehicle that is not provided with a steering transfer ratio variable device as described above, the amplification of the change in the steering reaction force and the phase change thereof associated with the actuation of the steering transfer ratio variable device are not taken into account. Therefore, if the above-described steering transfer ratio variable device is applied to such a steering control apparatus, the change in the steering reaction force cannot be effectively restrained; moreover, the steering reaction force may increase or the steering reaction force may change unnaturally in some cases.

Furthermore, if the steering torque is detected and the control gain in the control of the assist torque on the basis of the detected steering torque is set high in order to restrain the aforementioned increase or unnatural change in the steering reaction force, the assist torque for the steering torque attributed to ordinary steering operation becomes excessive, resulting in deteriorated steering feeling.

SUMMARY OF THE INVENTION

It is an object of the invention to restrain the increase or unnatural change in the steering reaction force attributed to the amplification of change in the steering reaction force or the change in phase thereof in association with fluctuations in the transfer torque through a universal joint in a vehicle equipped with a steering transfer ratio variable device and the actuation of the steering transfer ratio variable device, by controlling the assist torque, with attention focused on the amplification of change in the steering reaction force or the change in phase thereof A first aspect of the invention relates to a vehicular steering control apparatus. This vehicular steering control apparatus comprises a steering transfer system that transfers rotation of a steering wheel to a steered wheel turning mechanism that turns a steered wheel, and a universal joint provided in an intermediate portion of the steering transfer system. Furthermore, a steering transfer ratio variable device is provided in an intermediate portion of the steering transfer system, and changes a steering transfer ratio from the steering wheel to the steered wheel by changing relative rotation angle of a steered wheel turning mechanism-side steering shaft to a steering wheel-side steering shaft. A power steering device that generates steering assist torque is also provided. A control device is provided for computing a steering torque fluctuation-reducing steering assist torque control amount that is used to reduce fluctuation in steering torque transferred to the steering wheel based on rotation angle of the steering wheel and the relative rotation angle, and for controlling the power steering device based on the steering torque fluctuation-reducing steering assist torque control amount.

According to the construction of the vehicular steering control apparatus described above, the steering transfer system that transfers rotation of the steering wheel to the steered wheel turning mechanism that turns the steered wheel is provided, and the universal joint is provided in an intermediate portion of the steering transfer system. Furthermore, the steering transfer ratio variable device is provided in an intermediate portion of the steering transfer system, and changes the steering transfer ratio from the steering wheel to the steered wheel by changing the relative rotation angle of the steered wheel turning mechanism-side steering shaft to the steering wheel-side steering shaft. The power steering device that generates steering assist torque is also provided. In this control apparatus, the steering torque fluctuation-reducing steering assist torque control amount used to reduce fluctuation in the steering torque transferred to the steering wheel is computed on the basis of the rotation angle of the steering wheel and the relative rotation angle, and the power steering device is controlled on the basis of the steering torque fluctuation-reducing steering assist torque control amount. Therefore, the control apparatus is able to reliably and effectively restrain the increase or unnatural change in the steering reaction force attributed to the amplification of change in the steering reaction force or the change in phase thereof in association with fluctuations in the transfer torque through the universal joint and the actuation of the steering transfer ratio variable device.

A second aspect of the invention relates to a vehicular steering control method. This vehicular steering control method comprises: detecting relative rotation angle of a steered wheel turning mechanism-side steering shaft to a steering wheel-side steering shaft provided in an intermediate portion of a steering transfer system that transfers rotation of a steering wheel to a steered wheel turning mechanism that turns a steered wheel; computing a steering torque fluctuation-reducing steering assist torque control amount that is used to reduce fluctuation in steering torque transferred to the steering wheel based on rotation angle of the steering wheel and the relative rotation angle; and controlling steering assist torque based on the steering torque fluctuation-reducing steering assist control amount.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, embodiments of the invention will be described in detail with reference to the drawings.

Figure 1:
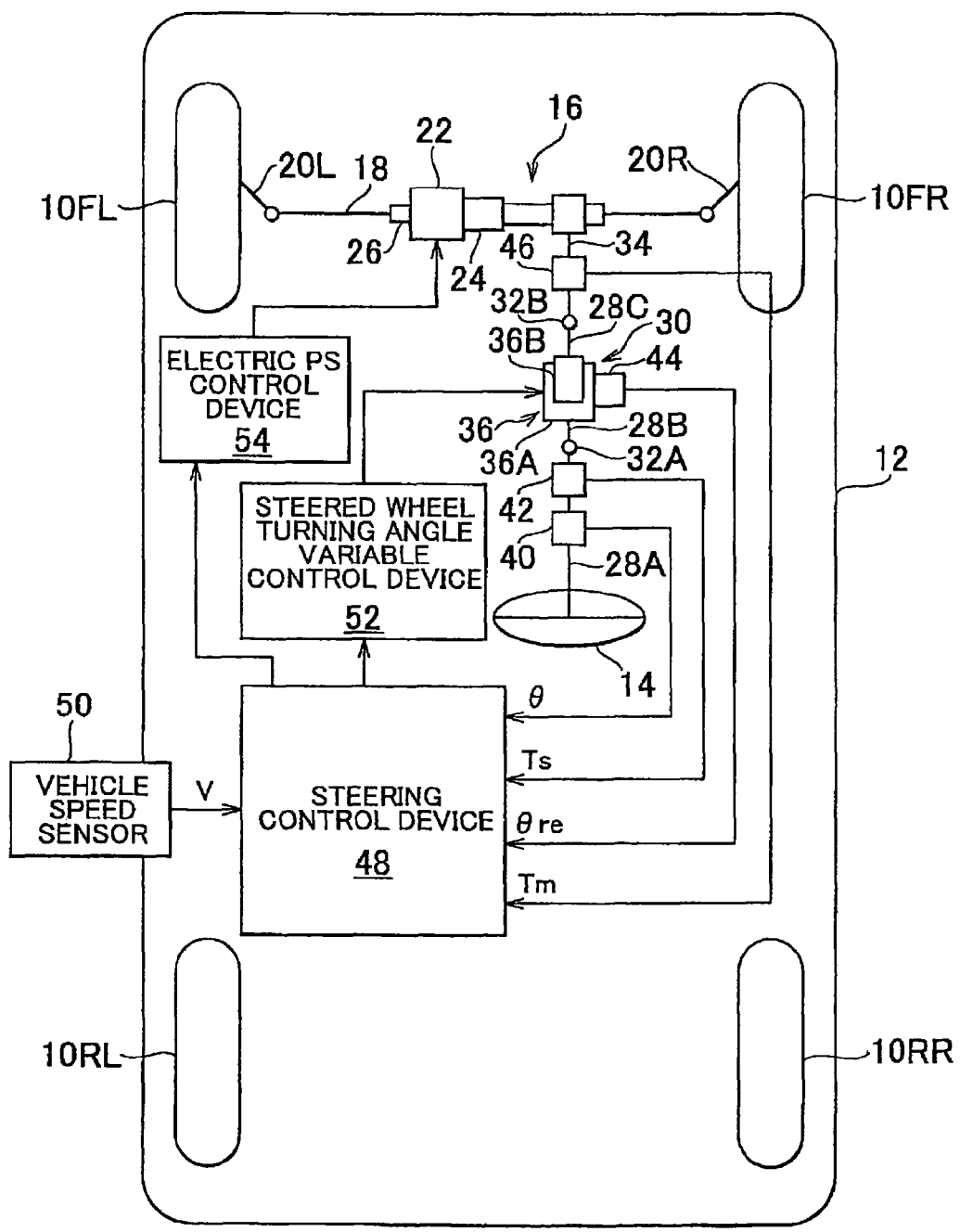
FIG. 1 is a schematic construction diagram showing an embodiment of the vehicular steering control apparatus of the invention applied to a vehicle equipped with an electric power steering device.
Figure 2:
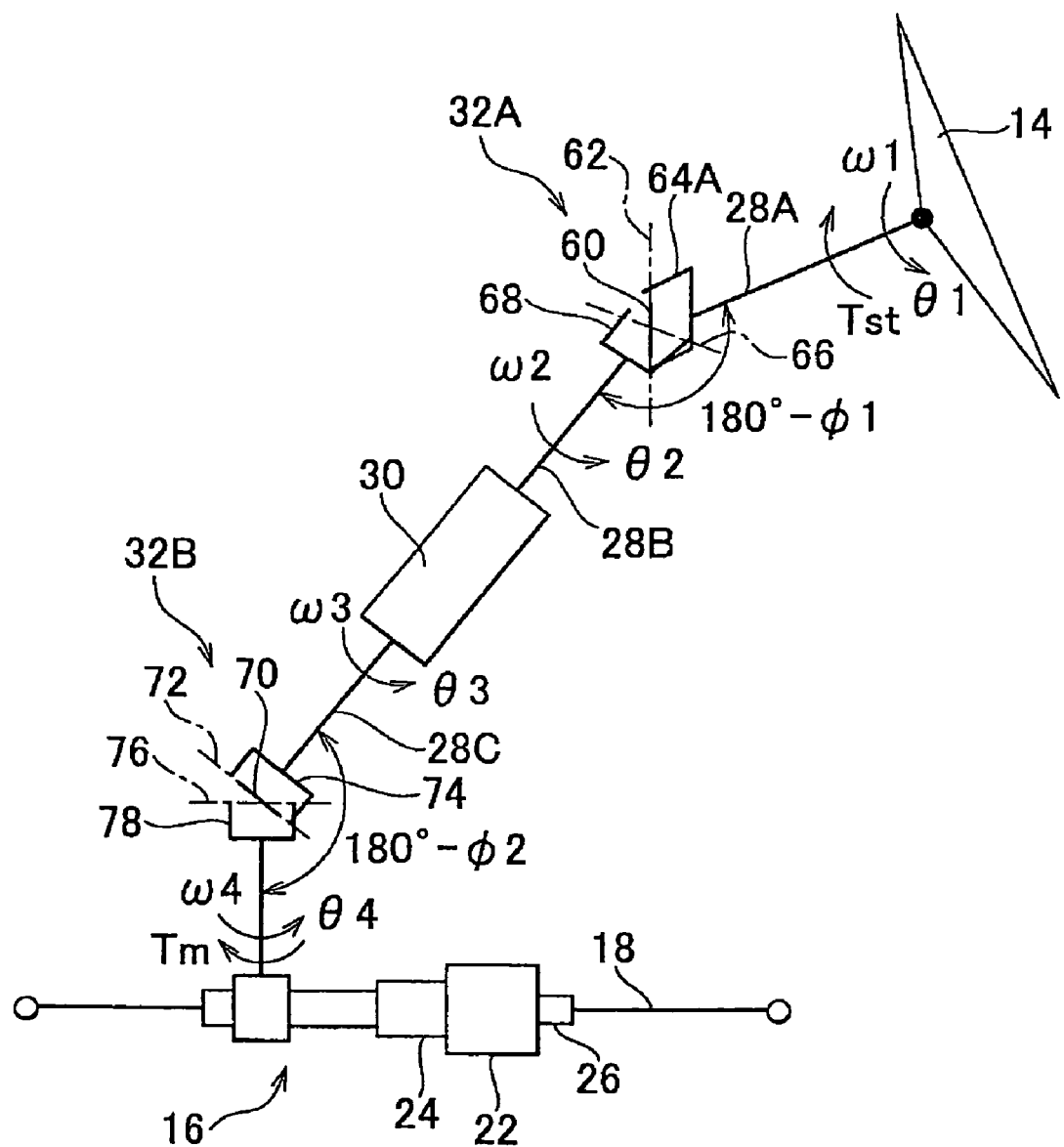
FIG. 2 is a perspective view showing, as a skeleton diagram, a steering system shown in FIG. 1.

FIG. 1 is a schematic construction diagram showing an embodiment of the vehicular steering control apparatus of the invention applied to a vehicle equipped with an electric power steering device. FIG. 2 is a perspective view showing, as a skeleton diagram, a steering system shown in FIG. 1.

In FIG. 1, a vehicle 12 has a left-side front wheel 10FL, a right-side front wheel 10FR, a left-side rear wheel 10RL, and a right-side rear wheel 10RR. The left and right-side front wheels 10FL, 10FR, which are steered wheels, are turned, via a rack bar 18 and tie rods 20L, 20R, by a rack-and-pinion type electric power steering device 16 that is driven in response to the operation of the steering wheel 14 performed by a driver.

In the embodiment shown in the drawing, the electric power steering device 16 is a rack coaxial type electric power steering device, and has an electric motor 22, and a conversion mechanism 24, for example, of a ball screw type, that converts the rotational torque of the electric motor 22 into forces in the directions of the reciprocating movements of the rack bar 18. Thus, the electric power steering device 16 functions as an assistance steering force generation device that lightens the steering burden on the driver by generating assistance steering force that relatively drives the rack bar 18 with respect to a housing 26. Incidentally, the assistance steering force generation device may have any construction known in the art A steering wheel 14 is drivingly connected to a pinion shaft 34 of the electric power steering device 16 via a main steering shaft 28A, an upper universal joint 32A, an upper intermediate shaft 28B, a steered wheel turning angle variable device 30, a lower intermediate shaft 28C, and a lower universal joint 32B. In the embodiment shown in the drawing, the main steering shaft 28A is rigidly coupled to the steering wheel 14. The steered wheel turning angle variable device 30 is rigidly coupled, at a housing 36A side thereof, to a lower end of the upper intermediate shaft 28B. The steered wheel turning angle variable device 30 includes an electric motor 36 for the purpose of assistance wheel turning drive which is rigidly coupled, at the side of a rotor 36B, to an upper end of the lower intermediate shaft 28C.

The steered wheel turning angle variable device 30 rotationally drives the lower intermediate shaft 28C relative to the upper intermediate shaft 28B. By thus controlling the relative rotation angle of the lower intermediate shaft 28C to the upper intermediate shaft 28B (simply referred to as "relative rotation angle" thereof), the steered wheel turning angle variable device 30 functions as a steering transfer ratio variable device that assistingly turns the left and right front wheels 10FL, 10FR, which are steered wheels, relative to the steering wheel 14, and thereby changes the steering transfer ratio from the steering wheel 14 to the left and right front wheels 10FL, 10FR.

As shown as a skeleton diagram in FIG. 2, the upper universal joint 32A is a cruciform joint having a cross piece 60, an upper trunnion 64 that is provided on a lower end of the main steering shaft 28A and that supports one of the shaft portions of the cross piece 60 rotatably about an axis 62 thereof, and a lower trunnion 68 that is provided on an upper end of the upper intermediate shaft 28B and that supports the other shaft portion of the cross piece 60 rotatably about an axis 66 thereof.

Likewise, the lower universal joint 32B is also a cruciform joint having a cross piece 70, an upper trunnion 74 that is provided on a lower end of the lower intermediate shaft 28C and that supports one of the shaft portions of the cross piece 70 rotatably about an axis 72 thereof, and a lower trunnion 78 that is provided on an upper end of the pinion shaft 34 and that supports the other shaft portion of the cross piece 70 rotatably about an axis 76 thereof.

In this description, the rotation angle of the steering wheel 14, that is, the steering angle, is represented by θ, and the input rotation angle and the angular speed to the upper universal joint 32A are represented by θ1 and ω1, respectively. The input rotation angle and the angular speed to the lower universal joint 32B are represented by θ2 and ω2, respectively. The intersection angle between the main steering shaft 28A and the upper intermediate shaft 28B is represented by φ1, and the intersection angle between the lower intermediate shaft 28C and the pinion shaft 34 is represented by φ2.

Figure 3A:
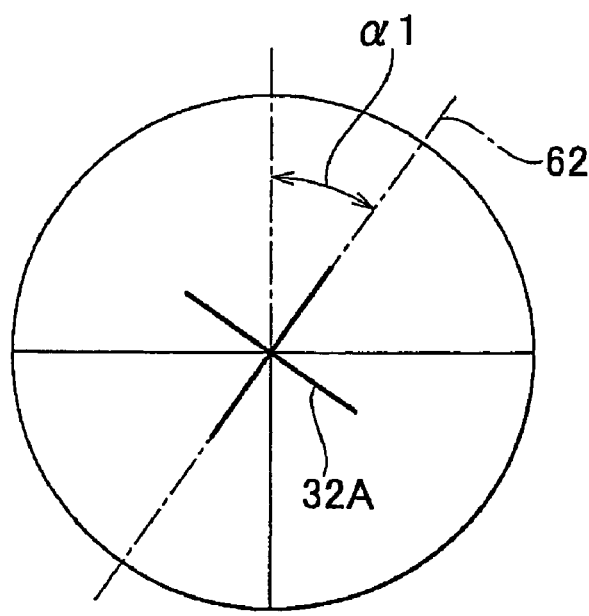
FIG. 3A is an explanatory diagram showing the advance angle of an upper universal joint with respect to a reference position of a steering wheel.
Figure 3B:
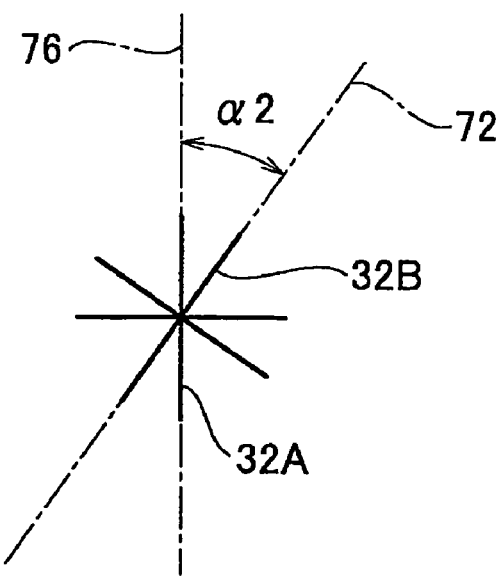
FIG. 3B is an explanatory diagram showing the advance angle of a lower universal joint with respect to the upper universal joint.

Furthermore, as shown in FIG. 3A, in a view around the axis of the main steering shaft 28A, the advance angle of the axis 62 of the upper universal joint 32A with respect to a reference position (neutral position) of the steering wheel 14 is represented by α1. Furthermore, as shown in FIG. 3B, in a view around the axis of the lower intermediate shaft 28C, the advance angle of the axis 72 of the lower universal joint 32B with respect to the axis 76 of the upper universal joint 32A is represented by α2.

The input rotation angle θ1 to the upper universal joint 32A is expressed by the expression 1 below, and the ratio ω2/ω1 of the angular speed ω2 to the angular speed ω1 is expressed by the expression 2 below.

$$\theta 1=\theta+\alpha 1 \qquad \text{(expression 1)}$$

$$\omega 2/\omega 1 = \cos\phi 1/(1-\sin^2\theta 1 \cdot \sin^2\phi 1) \qquad \text{(expression 2)}$$

Furthermore, the input rotation angle θ2 to the lower universal joint 32B is expressed by the expression 3 below. Where the speed increase ratio of the steered wheel turning angle variable device 30 is represented by Kvg, the relative rotation angle of the steered wheel turning angle variable device 30, that is, the relative rotation angle θre of the lower intermediate shaft 28C to the upper intermediate shaft 28B, is Kvg·θ. Therefore, the rotation angle θ3 of the lower intermediate shaft 28C is expressed by the expression 4 below, and the ratio ω4/ω3 of the angular speed ω4 of the pinion shaft 34 to the angular speed ω3 of the lower intermediate shaft 28C is expressed by the expression 5 below.

$$\theta 2 = \tan^{-1}(\tan\theta \cdot \cos\phi 1) \qquad \text{(expression 3)}$$

$$\theta 3 = \theta 2 + \alpha 2 + \theta re = \theta 2 + \alpha 2 + Kvg \cdot \theta \qquad \text{(expression 4)}$$

$$\omega 4/\omega 3 = \cos\phi 2/(1-\sin^2\theta 3 \cdot \sin^2\phi 2) \qquad \text{(expression 5)}$$

Therefore, the ratio Kst of the angular speed of the pinion shaft 34 to the angular speed of the steering wheel 14 is expressed by the following expression 6.

$$Kst = (\omega 2/\omega 1) \cdot (\omega 4/\omega 3) \qquad \text{(expression 6)}$$

Incidentally, the angular speed ω4 of the pinion shaft 34 is expressed by the expressin 7 below. Where the steering torque of the pinion shaft 34 is represented by Tm, the steering torque Tst transferred to the steering wheel 14 is expressed by the expression 8 below.

$$\omega 4 = Kst \cdot \omega 1 \qquad \text{(expression 7)}$$

$$Tst = Kst \cdot Tm \qquad \text{(expression 8)}$$

Figure 4:
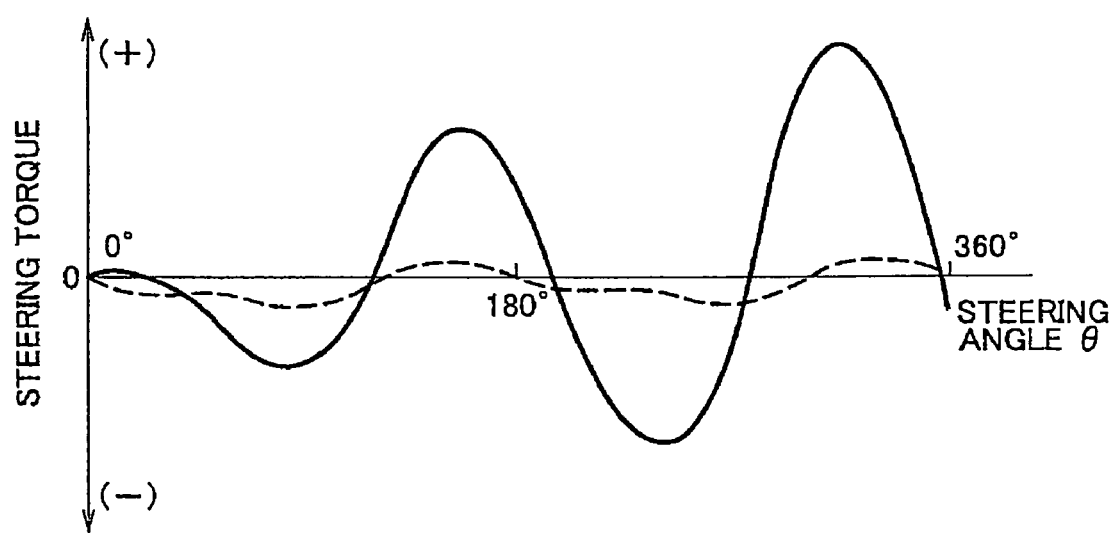
FIG. 4 is a graph showing relationships between the steering angle θ and the steering torque transferred to the steering wheel in the case (broken line) where the relative rotation angle of a steered wheel turning angle variable device is 0 and the case (solid line) where the steered wheel turning angle variable device is actuated.

As shown in FIG. 4, assuming that the steering torque Tsto transferred to the steering wheel 14 fluctuates in accordance with the steering angle θ as shown by a broken line when the relative rotation angle θre of the steered wheel turning angle variable device 30 is 0 regardless of the steering angle θ, in the case where the relative rotation angle θre (=Kvg·θ) of the steered wheel turning angle variable device 30 changes in accordance with the steering angle θ, the steering torque Tst transferred to the steering wheel 14 fluctuates with large amplitudes as shown by a solid line, in accordance with the expression 8. At the same time, the phase with respect to the steering angle θ becomes different from the phase of the steering torque Tm of the pinion shaft 34. Therefore, due to such changes in the steering torque, the steering feeling perceived by the driver during a steering operation deteriorates.

As can be understood from the foregoing description, the electric power steering device 16 and the tie rods 20L, 20R constitute a steered wheel turning mechanism that turns the steered wheels. Furthermore, the main steering shaft 28A, the upper intermediate shaft 28B, the lower intermediate shaft 28C and the pinion shaft 34 constitutes a steering transfer system that transfers the rotation of the steering wheel to the steered wheel turning mechanism. The upper universal joint 32A is a first cruciform joint, and the lower universal joint 32B is a second cruciform joint.

In the embodiment shown in the drawings, the main steering shaft 28A is provided with a steering angle sensor 40 that detects the rotation angle of the main steering shaft as a steering angle θ, and a torque sensor 42 that detects the steering torque Ts thereof. The steered wheel turning angle variable device 30 is provided with a rotation angle sensor 44 that detects the relative rotation angle θre thereof, and the pinion shaft 34 is provided with a torque sensor 46 that detects the steering torque Tm thereof. The outputs of these sensors are supplied to a steering control device 48. A signal showing the vehicle speed V detected by a vehicle speed sensor 50 is also input to the steering control device 48.

The steering control device 48 computes a target speed increase ratio Kvgt of the steered wheel turning angle variable device 30 on the basis of the vehicle speed V, and computes a target relative rotation angle θret of the steered wheel turning angle variable device 30 as a multiplication product of the target speed increase ratio Kvgt and the steering angle θ, and outputs a signal showing the target relative rotation angle θret to the steered wheel turning angle variable control device 52. Then, the steered wheel turning angle variable control device 52 controls the electric motor 36 so that the relative rotation angle θre of the steered wheel turning angle variable device 30 becomes equal to the target relative rotation angle θret, thereby controlling the steering transfer ratio.

Besides, the steering control device 48 computes the steering torque Tst transferred to the steering wheel 14 in accordance with the expression 8, and computes a deviation ΔTst between the steering torque Tst and the steering torque Tm of the pinion shaft 34. On the basis of the deviation ΔTst of the steering torque, the steering control device 48 computes a steering torque fluctuation-reducing target steering assist torque Tast for reducing the deviation ΔTst of the steering torque. Then, the steering control device 48 outputs a signal showing the steering torque fluctuation-reducing target steering assist torque Tast to an electric power steering (electric PS) control device 54.

The electric power steering (electric PS) control device 54 computes a basic steering assist torque Tab on the basis of the steering torque Ts detected by the torque sensor 42 and the vehicle speed V, and computes a sum of the basic steering assist torque Tab and the steering torque fluctuation-reducing target steering assist torque Tast as a final target steering assist torque Tat. Then, the electric power steering (electric PS) control device 54 controls the electric power steering device 16 so that the steering assist torque Ta becomes equal to the final target steering assist torque Tat.

Although not shown in detail in FIG. 1, each of the steering control device 48, the steered wheel turning angle variable control device 52 and the electric power steering control device 54 may be made up of a computer that has a CPU, a ROM, a RAM, and an input/output port device which are interconnected by a bidirectional common bus, as well as a drive circuit Furthermore, the steering angle sensor 40, the rotation angle sensor 44, and the torque sensors 42, 46 detect the steering angle θ, the relative rotation angle θre, and the steering torques Ts, Tm, respectively, with each of the values being positive in the case of steering in the direction of left turning of the vehicle.

Figure 5:
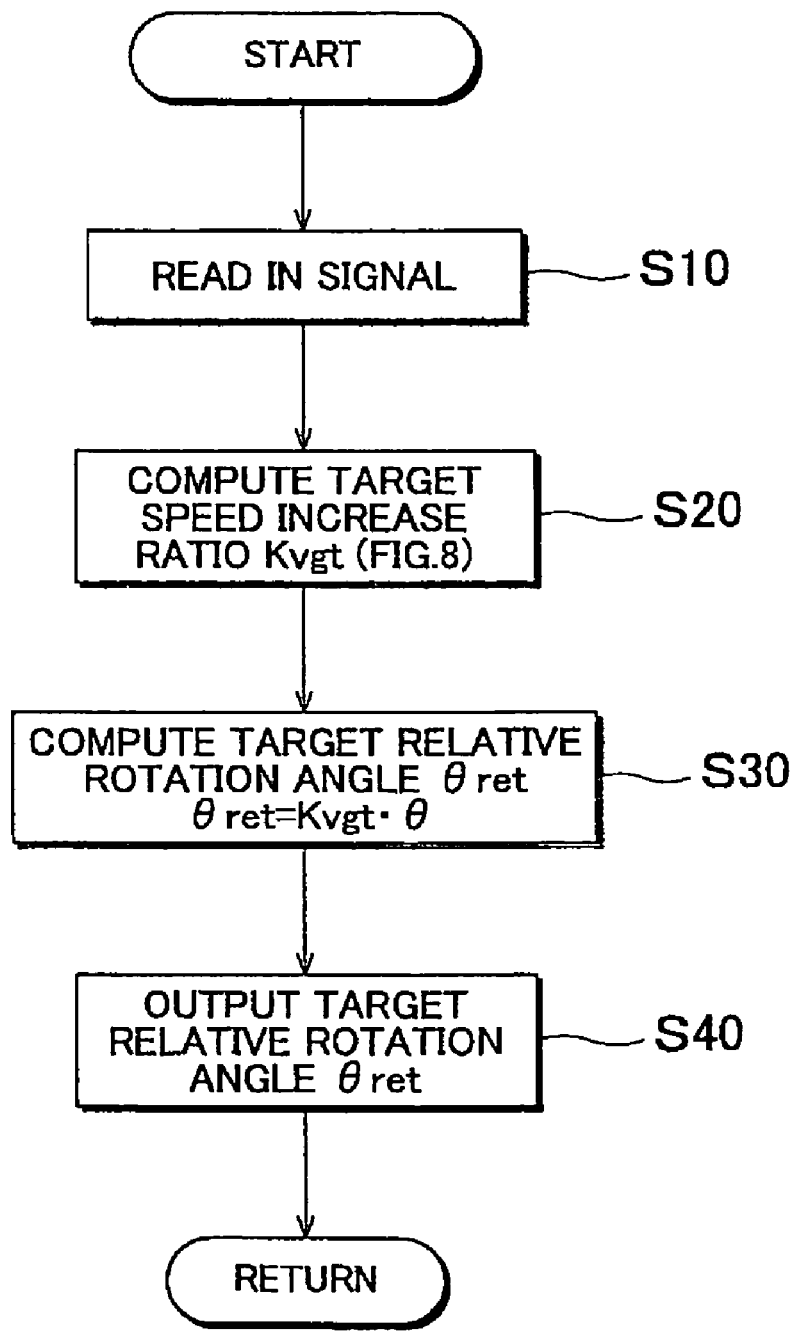
FIG. 5 is a flowchart showing a steering transfer ratio control routine accomplished by a steering control device in the embodiment.

Next, a steering transfer ratio control routine accomplished by the steering control device in the embodiment will be described with reference to a flowchart shown in FIG. 5. The control according to the flowchart shown in FIG. 5 is started by the closure of an ignition switch (not shown), and is repeatedly executed at every predetermined time.

Figure 8:
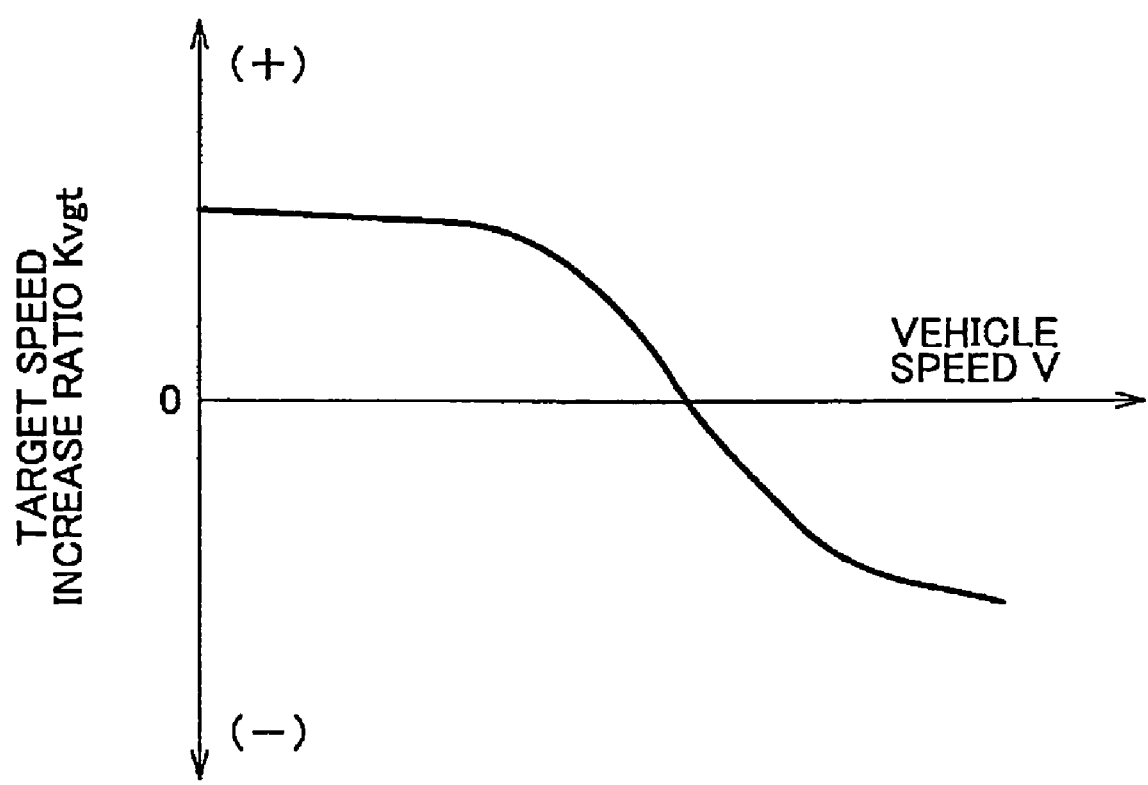
FIG. 8 is a graph showing a relationship between the vehicle speed V and the target speed increase ratio Kvgt.

Firstly, in step 10, a signal showing the steering angle θ detected by the steering angle sensor 40 and the like are read in. In step 20, on the basis of the vehicle speed V, the target speed increase ratio Kvgt of the steered wheel turning angle variable device 30 is computed from a map corresponding to a graph shown in FIG. 8. In step 30, the target relative rotation angle θret of the steered wheel turning angle variable device 30 is computed as a multiplication product of the target speed increase ratio Kvgt and the steering angle θ. In step 40, a signal showing the target relative rotation angle θret is output to the steered wheel turning angle variable control device 52.

Incidentally, the steered wheel turning angle variable control device 52 controls the electric motor 36 of the steered wheel turning angle variable device 30 so that the relative rotation angle θre of the steered wheel turning angle variable device 30 becomes equal to the target relative rotation angle θret, whereby the speed increase ratio of the steered wheel turning angle variable device 30 is controlled to the target speed increase ratio Kvgt.

Figure 6:
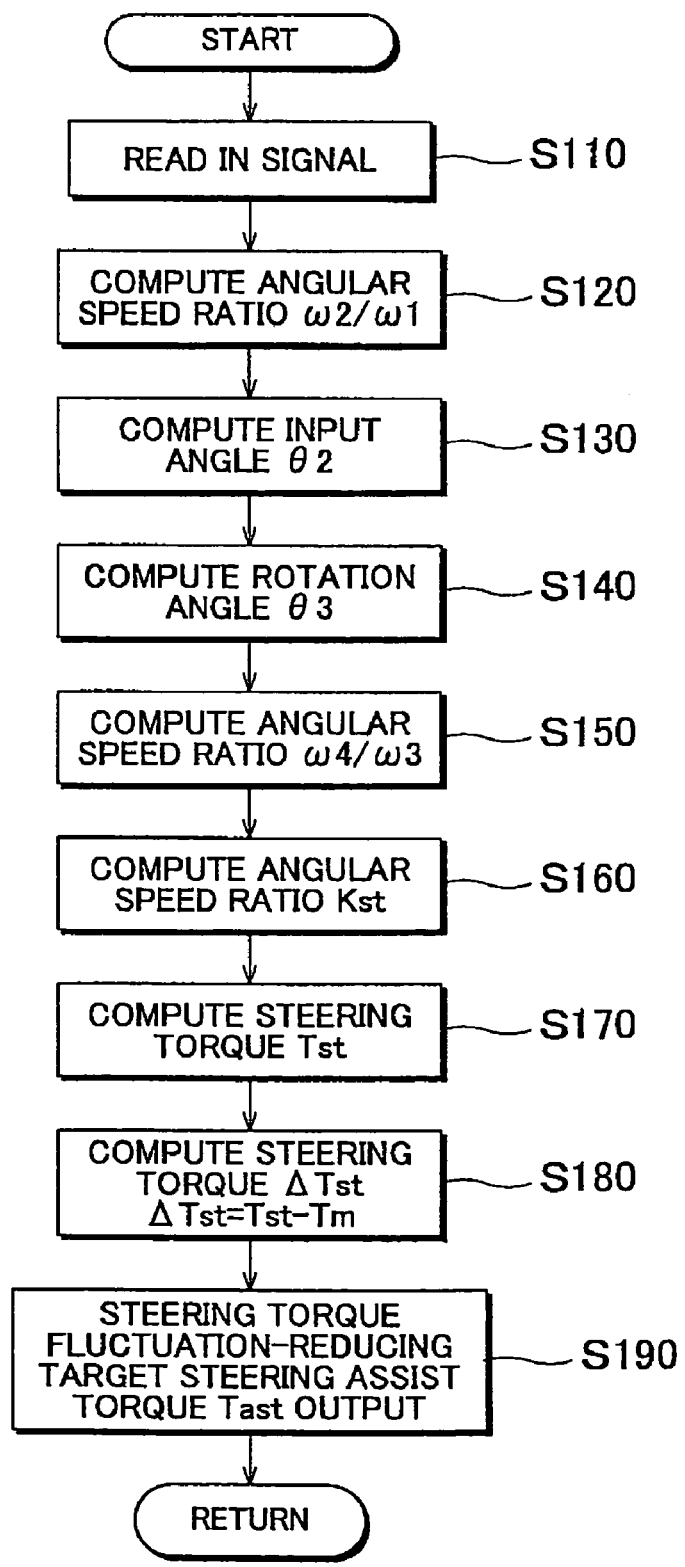
FIG. 6 is a flowchart showing a steering torque fluctuation-reducing target steering assist torque computation control routine accomplished by the steering control device in the embodiment.

Next, a steering torque fluctuation-reducing target steering assist torque computation control routine accomplished by the steering control device in the embodiment will be described with reference to a flowchart shown in FIG. 6. The control according to the flowchart shown in FIG. 6 is also started by the closure of the ignition switch (not shown), and is repeatedly executed at every predetermined time.

Firstly, in step 110, a signal showing the steering torque Tm detected by the torque sensor 46 and the like are read in. In step 120, the input rotation angle θ1 to the upper universal joint 32A is computed in accordance with the expression 1, and the ratio ω2/ω1 of the input rotation angular speed ω2 of the lower universal joint 32B to the input rotation angular speed ω1 of the upper universal joint 32A is computed in accordance with the expression 2.

In step 130, the input rotation angle θ2 to the lower universal joint 32B is computed in accordance with the expression 3. In step 140, the rotation angle θ3 of the lower intermediate shalt 28C is computed in accordance with the expression 4. In step 150, the ratio ω4/ω3 of the angular speed ω4 of the pinion shaft 34 to the angular speed ω3 of the lower intermediate shaft 28C is computed in accordance with the expression 5.

In step 160, the ratio Kst of the angular speed of the pinion shaft 34 to the angular speed of the steering wheel 14 is computed in accordance with the expression 6. In step 170, the steering torque Tst (estimated value) transferred to the steering wheel 14 is computed as a multiplication product of the ratio Kst of the angular speed and the steering torque Tm of the pinion shaft 34 in accordance with the expression 8.

In step 180, the steering torque ΔTst transferred to the steering wheel 14 due to actuation of the steered wheel turning angle variable device 30 is computed as a value obtained by subtracting the steering torque Tm of the pinion shaft 34 from the steering torque Tst transferred to the steering wheel 14, in accordance with the expression 9 below. In step 190, the deviation ΔTst of the steering torque is output to the electric power steering control device 54 as a steering torque fluctuation-reducing target steering assist torque Tast.

$$\Delta Tst = Tst - Tm \quad \text{(expression 9)}$$

Figure 7:
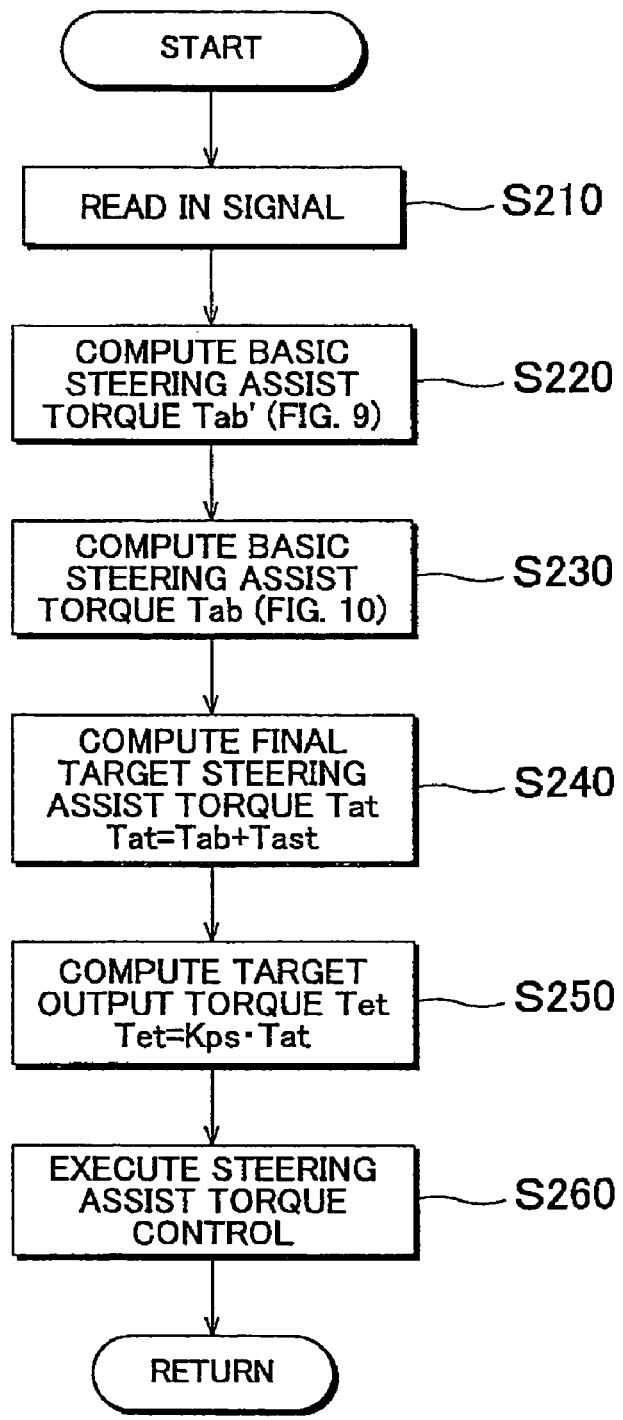
FIG. 7 is a flowchart showing a steering assist torque control routine accomplished by an electric power steering control device in the embodiment.

Next, a steering assist torque control routine accomplished by the electric power steering control device in the embodiment will be described with reference to a flowchart shown in FIG. 7. Incidentally, the control according to the flowchart shown in FIG. 7 is also started by the closure of the ignition switch (not shown), and is repeatedly executed at every predetermined time.

Figure 9:
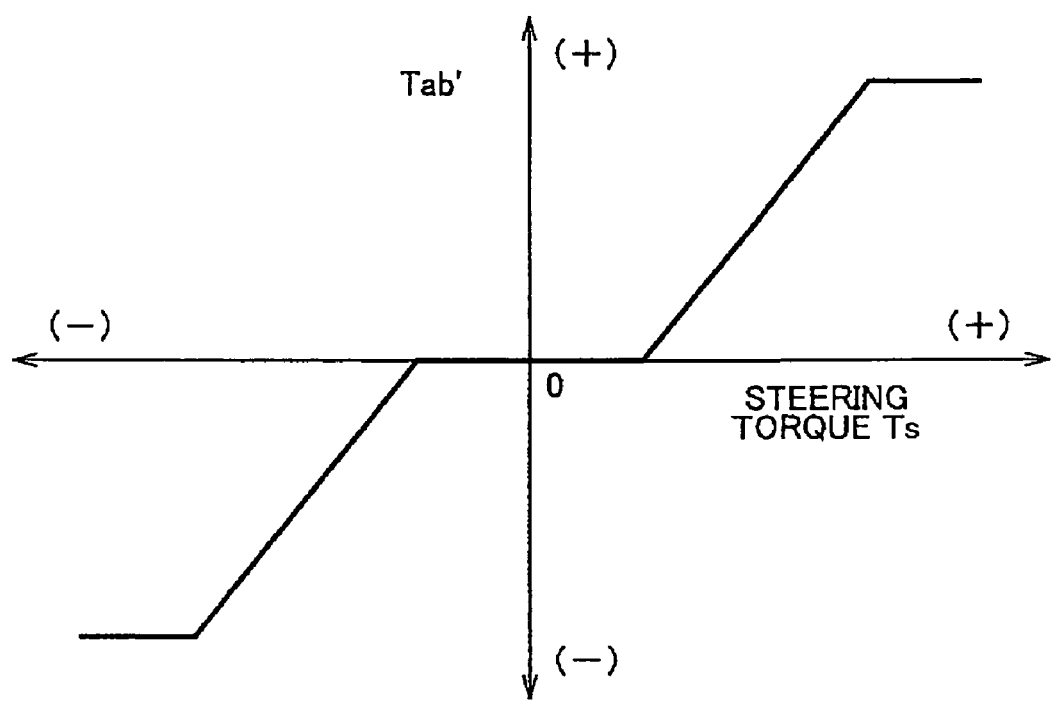
FIG. 9 is a graph showing a relationship between the steering torque Ts and the basic assist torque Tab'.

Firstly, in step 210, a signal showing the steering torque Ts detected by the torque sensor 42 and the like are read in. In step 220, on the basis of the steering torque Ts, a basic assist torque Tab' is computed from a map corresponding to a graph shown in FIG. 9 so that the magnitude of the basic assist torque Tab' becomes greater as the magnitude of the steering torque Ts becomes greater.

Figure 10:
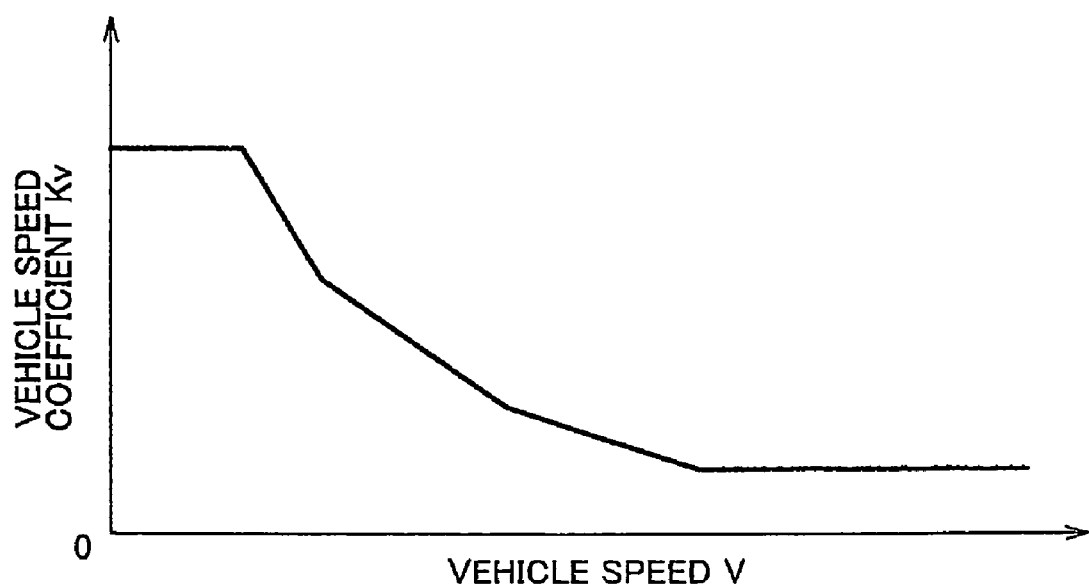
FIG. 10 is a graph showing a relationship between the vehicle speed V and the vehicle speed coefficient Kv.

In step 230, on the basis of the vehicle speed V, the vehicle speed coefficient Kv is computed from a map corresponding to a graph shown in FIG. 10 so that the vehicle speed coefficient Kv becomes smaller as the vehicle speed V becomes higher. Then, a post-correction basic steering assist torque Tab is computed as a multiplication product of the vehicle speed coefficient Kv and the basic assist torque Tab'.

In step 240, the sum of the post-correction basic steering assist torque Tab and the steering torque fluctuation-reducing target steering assist torque Tast is computed as a final target steering assist torque Tat In step 250, a target output torque Tet of the electric motor 22 for bringing the steering assist torque Ta to the final target steering assist torque Tat is computed in accordance with the expression 10 below, where Kps is a coefficient of the conversion from the torque on the pinion shaft 34 to the torque of the electric motor 22 of the electric power steering device 16. In step 260, the electric motor 22 of the electric power steering device 16 is controlled so that the output torque Te of the electric motor 22 becomes equal to the target output torque Tet.

$$Tet = Kps \cdot Tat \quad \text{(expression 10)}$$

Thus, according to the embodiment shown in the drawings, in step 120, the ratio ω2/ω1 of the input rotation angular speed ω2 of the lower universal joint 32B to the input rotation angular speed ω1 of the upper universal joint 32A is computed. In steps 130 to 150, the ratio ω4/ω3 of the angular speed ω4 of the pinion shaft 34 to the angular speed ω3 of the lower intermediate shaft 28C is computed. In step 160, the ratio Kst of the angular speed of the pinion shaft 34 to the angular speed of the steering wheel 14 is computed.

Then, in step 170, the steering torque Tst transferred to the steering wheel 14 is computed as the multiplication product of the ratio Kst of the angular speed and the steering torque Tm of the pinion shaft 34. In step 180, the steering torque ΔTst transferred to the steering wheel 14 due to actuation of the steered wheel turning angle variable device 30 is computed as the value obtained by subtracting the steering torque Tm of the pinion shaft 34 from the steering torque Tst transferred to the steering wheel 14. This steering torque ΔTst is output to the electric power steering control device 54 as the steering torque fluctuation-reducing target steering assist torque Tast.

Besides, in step 220, the post-correction basic steering assist torque Tab for reducing the steering burden on the driver by reducing the steering reaction force is computed. In step 240, the sum of the post-correction basic steering assist torque Tab and the steering torque fluctuation-reducing target steering assist torque Tast is computed as a final target steering assist torque Tat. In step 250, the target output torque Tet of the electric motor 22 for bringing the steering assist torque Ta to the final target steering assist torque Tat is computed. In step 260, the electric motor 22 of the electric power steering device 16 is controlled so that the output torque Te of the electric motor 22 becomes equal to the target output torque Tet.

Therefore, according to the embodiment shown in the drawings, since the steering torque ΔTst that is transferred to the steering wheel 14 and that is amplified and changed in phase by actuation of the steered wheel turning angle variable device 30 is cancelled out by the steering torque fluctuation-reducing target steering assist torque Tast, it is possible to reliably and effectively prevent great fluctuations in the steering reaction force transferred to the steering wheel 14 from being caused by actuation of the steered wheel turning angle variable device 30 and therefore prevent the thereby caused deterioration of the steering feeling.

In particular, according to the embodiment shown in the drawings, in step 220, the post-correction basic steering assist torque Tab for reducing the steering burden on the driver by reducing the steering reaction force in accordance with the steering torque Ts and the vehicle speed V is computed, and in step 240, the final target steering assist torque Tat is computed as the sum of the post-correction basic steering assist torque Tab and the steering torque fluctuation-reducing target steering assist torque Tast Therefore, it is possible to reliably and effectively prevent great fluctuations of the steering reaction force caused by actuation of the steered wheel turning angle variable device 30 and therefore prevent the thereby caused deterioration of the steering feeling while reducing the steering burden on the driver by properly reducing the steering reaction force in accordance with the steering torque Ts and the vehicle speed V.

In the example shown in FIG. 4, according to the steering torque fluctuation-reducing target steering assist torque Tast, the steering reaction force transferred to the steering wheel 14 becomes similar to the steering torque Tsto, and therefore cannot cancel out the steering torque Tsto. However, the amplitude of the steering torque Tsto is small. Furthermore, according to the embodiment shown in the drawings, the transfer of the steering reaction force corresponding to the steering torque Tsto to the steering wheel 14 is effectively restrained by the basic steering assist torque Tab.

Although the invention has been described in detail above with reference to specific embodiments, the invention is not limited to the above-described embodiments. On the contrary, it should be apparent to those of ordinary skill in the art that the various other embodiments are also possible within the scope of the invention.

For example, although in the foregoing embodiments, the target relative rotation angle θret of the steered wheel turning angle variable device 30 is computed on the basis of the target speed increase ratio Kvgt and the steering angle θ, a modification may be made such that the target relative rotation angle θret is computed on the basis of the target steering transfer ratio or the target steering gear ratio and the steering angle θ.

Furthermore, in the foregoing embodiments, in the steering system, the upper universal joint 32A as a first cruciform joint and the lower universal joint 32B as a second cruciform joint are provided, and the steered wheel turning angle variable device 30 is provided between the upper universal joint 32A and the lower universal joint 32B. However, the invention may also be applied to a vehicle that has only one cruciform joint in the steering system.

Furthermore, in the foregoing embodiments, in step 220, the basic assist torque Tab' is computed on the basis of the steering torque Ts, and the post-correction basic steering assist torque Tab is computed as the multiplication product of the vehicle speed coefficient Kv and the basic assist torque Tab', and the sum of the post-correction basic steering assist torque Tab and the steering torque fluctuation-reducing target steering assist torque Tast is computed as the final target steering assist torque Tat. However, the basic steering assist torque Tab for reducing the steering reaction force in connection with the steering may be computed in any manner known in the art.

Furthermore, in the foregoing embodiments, the steered wheel turning angle variable device 30 is controlled by the steered wheel turning angle variable control device 52, and the electric power steering device 16 is controlled by the electric power steering control device 54, and the steered wheel turning angle variable control device 52 and the electric power steering control device 54 are controlled by the steering control device 48. However, at least two of these control devices may be integrated into one control device.

What is claimed is:

1. A vehicular steering control apparatus comprising:
a steering transfer system that transfers rotation of a steering wheel to a steered wheel turning mechanism that turns a steered wheel;
a universal joint provided in an intermediate portion of the steering transfer system;
a steering transfer ratio variable device which is provided in the intermediate portion of the steering transfer system and which changes a steering transfer ratio from the steering wheel to the steered wheel by changing a relative rotation angle of a steered wheel turning mechanism-side steering shaft to a steering wheel-side steering shaft;
a power steering device that generates a steering assist torque; and
a control device which computes a steering torque fluctuation-reducing steering assist torque control amount that is used to reduce fluctuation in steering torque transferred to the steering wheel based on a rotation angle of the steering wheel and the relative rotation angle, and which controls the power steering device based on the steering torque fluctuation-reducing steering assist torque control amount, wherein
the steered wheel turning mechanism includes a rack-and-pinion steering device having a pinion shaft that is coupled to the steered wheel turning mechanism-side steering shaft by the universal joint, and
the control device computes a ratio of an angular speed of the pinion shaft to an angular speed of the steering wheel based on the rotation angle of the steering wheel and the relative rotation angle, detects a steering torque of the pinion shaft, and computes the steering torque fluctuation-reducing steering assist torque control amount based on the ratio of the angular speed and the steering torque of the pinion shaft.

2. The vehicular steering control apparatus according to claim 1, wherein the universal joint includes: a first universal joint located at a steering wheel side of the steering transfer ratio variable device; and a second universal joint located at a steered wheel turning mechanism side of the steering transfer ratio variable device.

3. The vehicular steering control apparatus according to claim 1, wherein the universal joint is provided between the steering wheel-side steering shaft and the steering transfer ratio variable device.

4. The vehicular steering control apparatus according to claim 2, wherein:

the first universal joint is provided between the steering wheel-side steering shaft and the steering transfer ratio variable device; and the second universal joint is provided between the steering transfer ratio variable device and the steered wheel turning mechanism.

5. The vehicular steering control apparatus according to claim 1, wherein the steering transfer ratio variable device is provided between the steering wheel-side steering shaft and the steered wheel turning mechanism.

6. The vehicular steering control apparatus according to claim 1, wherein the steering transfer ratio variable device changes the steering transfer ratio based on vehicle speed of a vehicle.

7. The vehicular steering control apparatus according to claim 1, wherein the universal joint is a cruciform joint.

8. The vehicular steering control apparatus according to claim 2, wherein the first universal joint and the second universal joint are cruciform joints.

9. The vehicular steering control apparatus according to claim 1, wherein the control apparatus computes the basic assist torque based on the steering torque associated with steering operation of the steering wheel, computes a basic steering assist torque based on vehicle speed of a vehicle and the basic assist torque, computes, as a final target steering assist torque, a sum of the steering torque transferred to the steering wheel and the basic steering assist torque, computes the steering torque fluctuation-reducing steering assist torque control amount based on the final target steering assist torque, and controls the power steering device based on the steering torque fluctuation-reducing steering assist torque control amount.

10. The vehicular steering control apparatus according to claim 1, wherein the power steering device is an electric power steering device.

11. The vehicular steering control apparatus according to claim 1, wherein the power steering device is a rack coaxial electric power steering device.

12. The vehicular steering control apparatus according to claim 1, wherein the control device computes a ratio of angular speed of the steering wheel-side steering shaft to the angular speed of the steering wheel as a first angular speed ratio, computes a ratio of the angular speed of the pinion shaft to angular speed of the steered wheel turning mechanism-side steering shaft as a second angular speed ratio, and computes a multiplication product of the first angular speed ratio and the second angular speed ratio as the ratio of the angular speed of the pinion shaft to the angular speed of the steering wheel.

13. A vehicular steering control apparatus comprising:

a steering transfer system that transfers rotation of a steering wheel to a steered wheel turning mechanism that turns a steered wheel;

a universal joint provided in an intermediate portion of the steering transfer system;

steering transfer ratio variable means provided in the intermediate portion of the steering transfer system for changing a steering transfer ratio from the steering wheel to the steered wheel by changing a relative rotation angle of a steered wheel turning mechanism-side steering shaft to a steering wheel-side steering shaft;

a power steering device that generates a steering assist torque; and power steering control means for computing a steering torque fluctuation-reducing steering assist torque control amount that is used to reduce fluctuation in steering torque transferred to the steering wheel based on a rotation angle of the steering wheel and the relative rotation angle, and for controlling the power steering device based on the steering torque fluctuation-reducing steering assist torque control amount, wherein the steered wheel turning mechanism includes a rack-and-pinion type steering device having a pinion shaft that is coupled to the steered wheel turning mechanism-side steering shaft by the universal joint, and the power steering control means computes a ratio of an angular speed of the pinion shaft to an angular speed of the steering wheel based on the rotation angle of the steering wheel and the relative rotation angle, detects a steering torque of the pinion shaft, and computes the steering torque fluctuation-reducing steering assist torque control amount based on the ratio of the angular speed and the steering torque of the pinion shaft.

14. A vehicular steering control method comprising:

detecting a relative rotation angle of a steered wheel turning mechanism-side steering shaft to a steering wheel-side steering shaft provided in an intermediate portion of a steering transfer system that transfers rotation of a steering wheel to a steered wheel turning mechanism that turns the steered wheel, the steering transfer system including a steering transfer ratio variable device provided in the intermediate portion of the steering transfer system and which changes a steering transfer ratio from the steering wheel to the steered wheel by changing the relative rotation angle of the steered wheel turning mechanism-side steering shaft to the steering wheel-side steering shaft, the steering transfer system also including a universal joint in the intermediate portion;

computing a steering torque fluctuation-reducing steering assist torque control amount that is used to reduce fluctuation in steering torque transferred to the steering wheel based on a rotation angle of the steering wheel and the relative rotation angle; and controlling a steering assist torque based on the steering torque fluctuation-reducing steering assist control amount, wherein the computing includes:

(i) computing a ratio of an angular speed of a pinion shaft to an angular speed of the steering wheel based on the rotation angle of the steering wheel and the relative rotation angle, the steered wheel turning mechanism including a rack-and-pinion steering device having the pinion shaft that is coupled to the steered wheel turning mechanism-side steering shaft by the universal joint, (ii) detecting a steering torque of the pinion shaft, and (iii) computing the steering torque fluctuation-reducing steering assist torque control amount based on the ratio of the angular speed and the steering torque of the pinion shaft.

* * * * *